United States Patent [19]
Schmitt et al.

[11] 3,991,787
[45] Nov. 16, 1976

[54] MODULATION CONTROL VALVE FOR HYDRAULICALLY OPERATED WINCH

[75] Inventors: James L. Schmitt, Washington; David S. Ohaver, Canton, both of Ill.

[73] Assignee: Caterpillar Tractor Co., Peoria, Ill.

[22] Filed: July 15, 1974

[21] Appl. No.: 488,703

Related U.S. Application Data

[62] Division of Ser. No. 334,353, Feb. 21, 1973, Pat. No. 3,841,608.

[52] U.S. Cl. .......................... 137/596.13; 192/12 C
[51] Int. Cl.² .......................................... F15B 13/06
[58] Field of Search .................. 137/596.13, 625.69; 192/12 C, 87.13

[56] References Cited
UNITED STATES PATENTS

| | | | |
|---|---|---|---|
| 3,225,781 | 12/1965 | Kruger et al. | 137/596.13 X |
| 3,295,420 | 1/1967 | Gleason | 91/413 X |
| 3,468,194 | 9/1969 | Horsch et al. | 192/87.13 X |
| 3,529,702 | 9/1970 | Eckstein | 137/625.69 X |
| 3,722,543 | 3/1973 | Tennis | 137/596.12 |
| 3,756,564 | 9/1973 | Murray et al. | 254/187 R |

FOREIGN PATENTS OR APPLICATIONS

| | | | |
|---|---|---|---|
| 740,318 | 11/1955 | United Kingdom | 137/596.13 |

*Primary Examiner*—Alan Cohan
*Assistant Examiner*—Gerald A. Michalsky
*Attorney, Agent, or Firm*—Phillips, Moore, Weissenberger, Lempio & Strabala

[57] ABSTRACT

A hydraulically operated winch of the type adapted for logging or towing operations and having a rotatable winch drum about which a cable or line is entrained, a normally disengaged clutch being hydraulically operable to provide a coupling between a power input member and a winch drum drive shaft, a normally engaged friction brake normally securing the winch drum drive shaft against rotation while being hydraulically disengagable and a normally engaged clutch providing a selective coupling between the winch drum drive shaft and the winch drum. A modulating control valve for the winch includes a valve body having an inlet chamber in communication with a source of fluid under pressure, a single regulating spool in the valve being operable to selectively communicate fluid under pressure from the inlet chamber with respective actuating chambers for the brake and the two clutches, the valve also including a modulating valve responsive to the positioning of the regulating spool for modulating fluid pressure in the inlet chamber.

7 Claims, 7 Drawing Figures

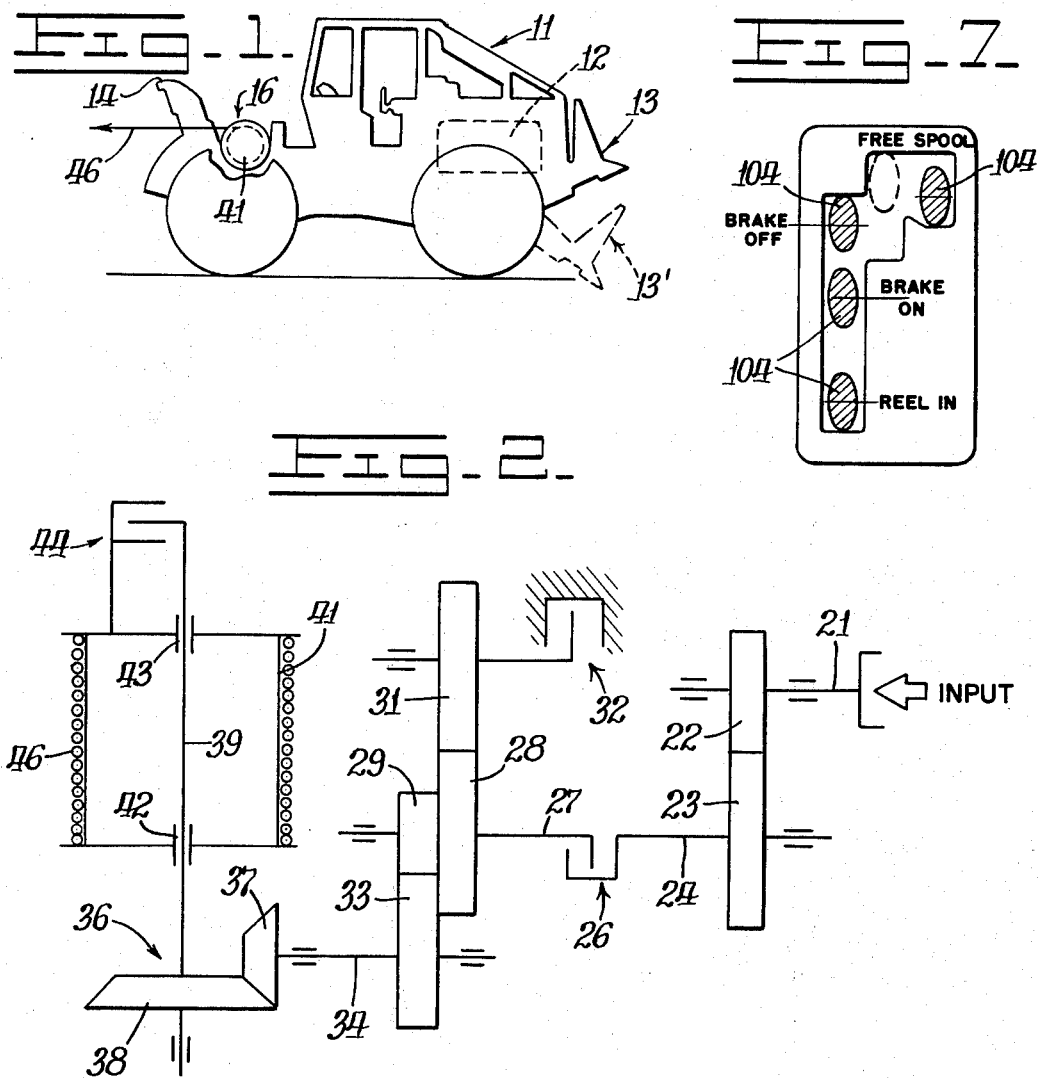
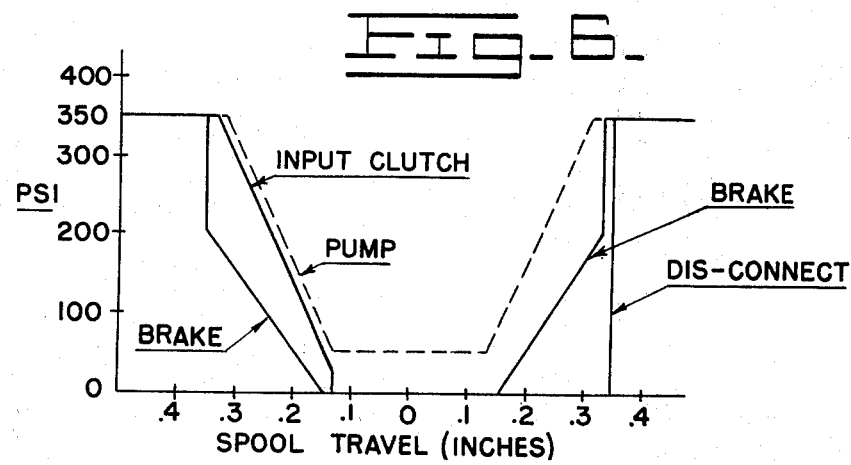

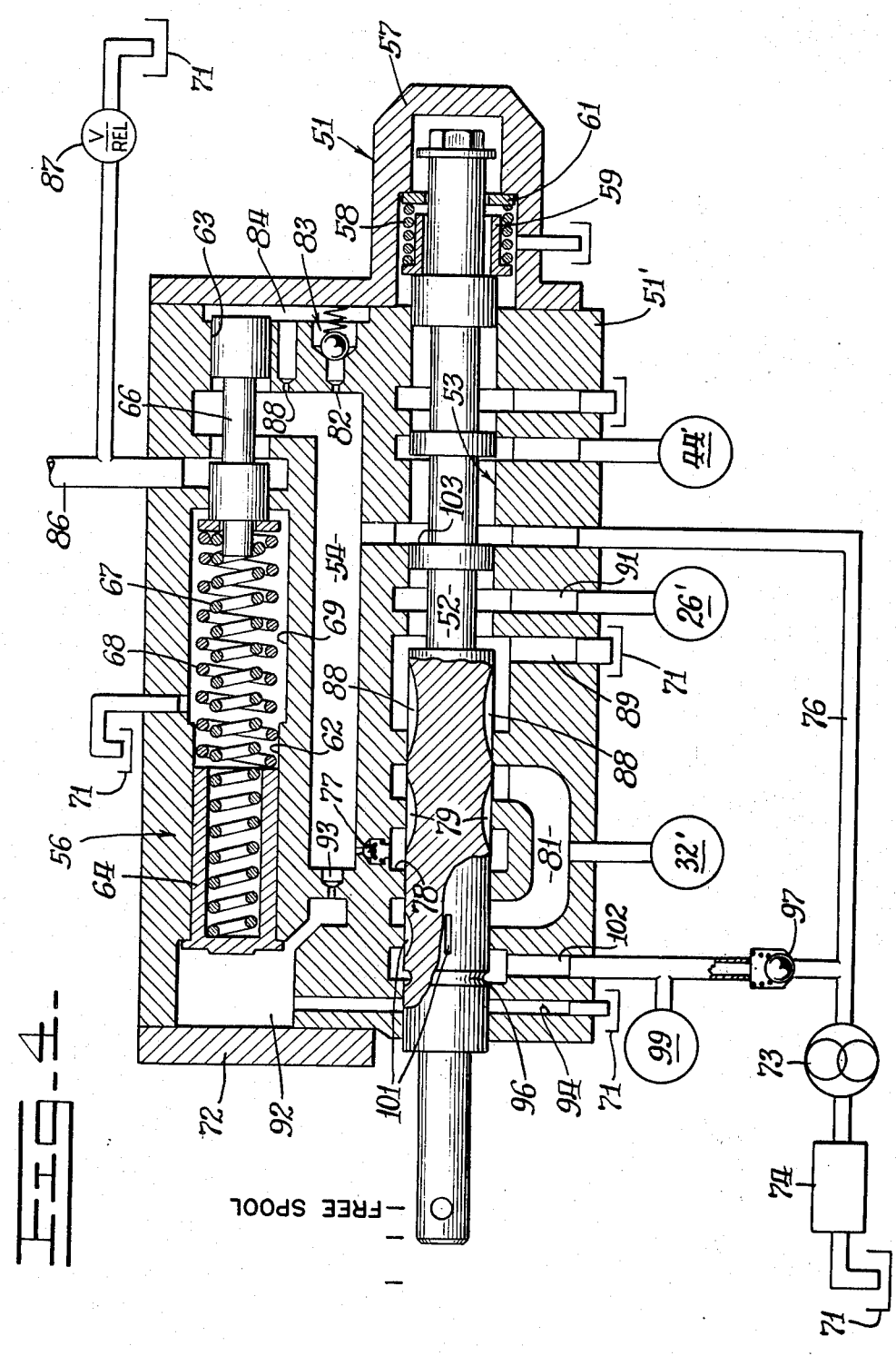

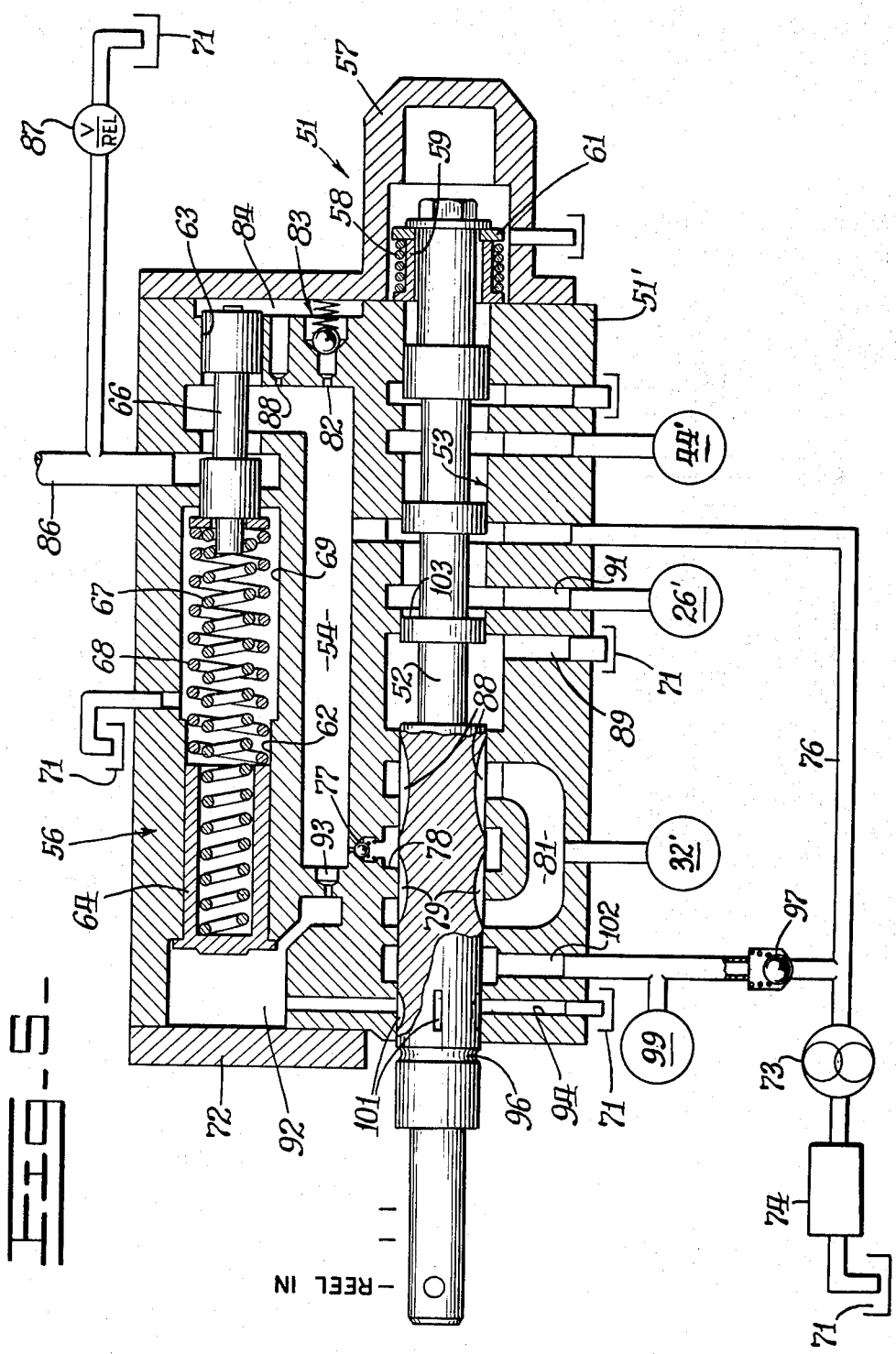

MODULATION CONTROL VALVE FOR HYDRAULICALLY OPERATED WINCH

This is a division of Ser. No. 334,353, filed Feb. 21, 1973, now U.S. Pat. No. 3,841,608.

BACKGROUND OF THE INVENTION

The present invention relates to a hydraulically operated winch and a modulating control valve for operating the winch.

The winch is preferably of a type adapted for mounting upon a vehicle used in towing or logging applications. The winch is further contemplated as having a normally disengaged clutch which is hydraulically operable for driving a winch drum in rotation, a normally engaged brake being operable in opposition with the normally disengaged clutch to hold the winch drum against rotation for supporting a load or along to selectively permit rotation of the winch drum, for example in lowering a load, an additional clutch being normally engaged to provide a coupling between the winch drum and a drive shaft while being hydraulically disengageable to permit free wheeling of the winch drum.

A winch of this type is disclosed in greater detail by a co-pending U.S. patent application Ser. No. 334,354, now abandoned, filed on Feb. 21, 1973 by Lyle F. Yates et al.

As noted in the co-pendng Patent application, it is desirable to provide for operation of such a winch system in a plurality of modes by a single control element. For example, it is desirable to synchronously operate the brake and the normally disengaged clutch in order to reel in a load, to hold the load by means of the brake and to selectively release the load by partially or completely disengaging the brake. In a further mode of operation, it is desirable to selectively disengage the normally engaged clutch to permit free wheeling of the winch drum. This mode of operation facilitates manual unwinding of cable from the winch drum for example by eliminating drag caused by internal components of the winch assembly.

SUMMARY OF THE INVENTION

Accordingly, it is an object of the present invention to provide a winch of the type disclosed above together with a modulating control valve for operating the winch assembly.

It is a further object of the invention to provide a modulating control valve which is operable for actuating a normally disengaged clutch, a normally engaged brake and a normally engaged clutch respectively arranged within a power train for a winch drum of the winch assembly.

It is a further object of the invention to provide such a modulating control valve having a single regulating spool for selectively actuating the two clutches and the brake of such a winch assembly.

It is a still further object of the invention to provide such a modulating control valve having therein modulating means which are also responsive to the regulating spool.

Additional objects and advantages of the present invention are made apparent in the following description having reference to the accompanying drawings.

BRIEF SUMMARY OF THE DRAWINGS

FIG. 1 is a side elevation view of a log skidder including a towing or logging winch constructed according to the present invention.

FIG. 2 is a schematic representation of the winch drum and drive train included within the winch assembly of FIG. 1.

FIGS. 4 and 5 are views similar to FIG. 3 with the control valve being illustrated in different operating positions.

FIG. 6 is a graphical representation of pressure traces developed by the control valves of FIGS. 3-5 in accordance with displacement of a regulating spool from a centered position within the valve assembly.

FIG. 7 is a simple representation of a shift pattern for a single control member controlling the regulating spool within the control valve assembly of FIGS. 3-5.

DESCRIPTION OF A PREFERRED EMBODIMENT

Figure 3:
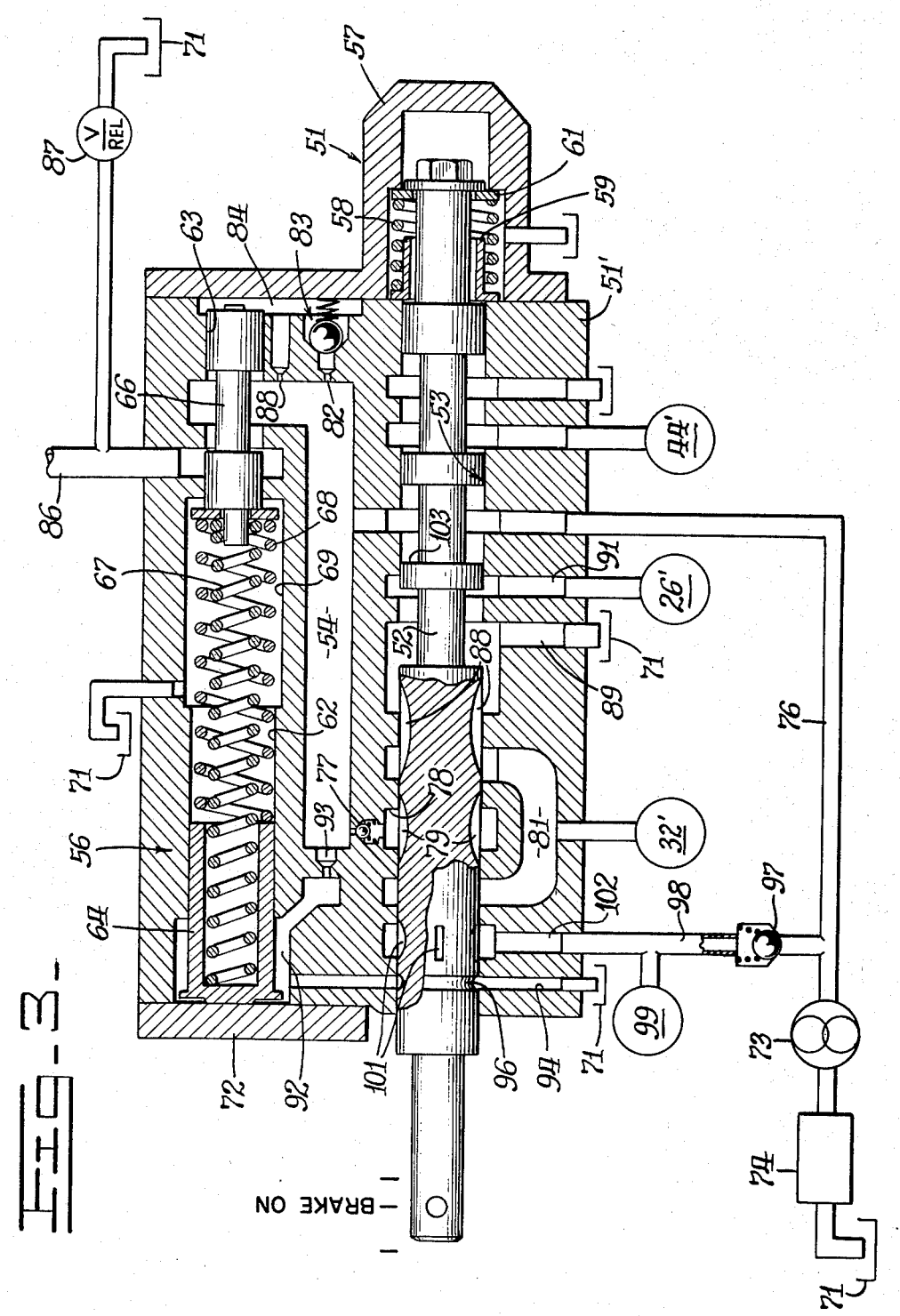
FIG. 3 is a side view with parts in section of a hydraulic control valve, additional components of a hydraulic control circuit for the winch assembly of FIGS. 1 and 2 being illustrated schematically.

A winch constructed according to the present invention is particularly adapted for use as a towing or logging winch in a log skidder vehicle of the type illustrated at 11 in FIG. 1. The vehicle and winch assembly are also described in greater detail within the co-pending Patent application referred to above.

The vehicle 11 of FIG. 1 includes a prime mover or engine as illustrated in phantom at 12. To adapt the vehicle for logging operations, it may include a bulldozer blade mounted upon one end of the vehicle for movement between a raised position illustrated in solid lines at 13 and a lowered position illustrated in phantom at 13'. To adapt the vehicle for towing operations, it includes an arch arranged upon the other end of the vehicle as illustrated at 14 and a winch assembly as indicated at 16.

Referring particularly to FIG. 2, a power train for the winch assembly includes a power input shaft 21 which may comprise a standard power take-off from the prime mover 12 of the vehicle in FIG. 1 for example. The input shaft 21 is coupled by means of meshing transfer gears 22 and 23 with an input shaft 24 for a normally disengaged friction clutch 26. An output shaft 27 for the clutch 26 is coupled with a clutch output gear 28 which is secured for rotation with a transfer gear 29. The clutch output gear 28 meshes with a brake gear 31 while a normally engaged friction brake 32 is operable to secure the brake gear 31 against rotation.

The components described above in engagement with the input shaft 21 comprise an intermediate portion of the drive train. The normally disengaged clutch 26 permits driving operation of the gear components within the intermediate drive train by the input shaft 21. The normally engaged brake 32 in one mode of operation, tends to be disengaged as the clutch 26 is engaged or conversely, tends to be engaged as the clutch 26 is disengaged. Thus, the brake 32 serves to prevent rotation of the intermediate drive train or at least those components on the output side of the clutch 26 when the clutch 26 is disengaged. In this connection, the hydraulic control system described below is adapted to selectively operate the brake 32 and clutch 26 in opposition with each other or to operate the brake 32 alone, the control system having a hydraulic control valve with modulating means particularly adapted for operation of the brake 32 and clutch 26.

An output portion of the winch drive train includes a transfer gear 33 arranged in meshing engagement with the gear 29. The gear 33 is mounted upon an input shaft 34 for a bevel gear assembly 36 having bevel gears 37 and 38. A winch drum shaft 39 provides an output for the bevel gear assembly 36 with a winch drum 41 being arranged for rotation upon the shaft 39 by means of bearings 42 and 43.

A jaw-type clutch 44 is normally engaged to provide a coupling between the winch drum shaft 39 and the drum 41 while being selectively disengageable to permit free wheeling of the drum 41. Referring momentarily to FIG. 1, it may be seen that a line or cable 46 is entrained about the drum 41 for operation in conjunction with the arch 14.

Referring now to FIGS. 3–5, a hydraulic control circuit for operating the winch assembly of FIGS. 1 and 2 is constructed according to the present invention to include a single, relatively simple control valve 51 operable by a single control element as discussed in greater detail below to operate the winch assembly 16 in three distinct modes of operation. The control valve 51 includes a regulating spool 52 slidably arranged in a bore 53. The regulating spool 52 controls fluid communication between an inlet chamber 54 and actuating chambers 26', 32' and 44' for the clutches and brake referenced by corresponding numerals in FIG. 2. Fluid pressure within the inlet chamber 54 is modulated by a modulating valve assembly 56 which is also responsive to positioning of the regulating spool 52.

The three operating conditions referred to above include a "hold" position with the regulating spool 52 being in its centered position as illustrated in FIG. 3. In this condition, the two clutches 26, 44, and the brake 32 are in their normal conditions; in other words, the clutch 26 is disengaged, the clutch 44 is engaged, and the brake 32 is engaged. In a second operating condition, the regulating spool 52 is moveable in a leftwardly direction as viewed in FIG. 3 toward a position illustrated in FIG. 5 wherein the brake 32 is gradually released and the clutch 26 is engaged for reeling in the line or cable illustrated at 46 in FIG. 1.

The regulating spool 52 is also moveable in a rightward direction toward the position illustrated in FIG. 4. However, before the spool is moved fully into the position of FIG. 4, the brake 32 is again gradually released to permit lowering or releasing of a load supported by the cable 45 of FIG. 1. In this mode of operation, it is noted that the clutch 26 is not simultaneously engaged. The regulating spool 52 is further moveable in a rightward direction to a position as illustrated in FIG. 4 where the brake 32 remains disengaged and the clutch 44 is also completely disengaged to permit free wheeling operation of the winch drum 41. This operating position enables an operator to manually unreel cable from the drum 41 free from drag which would normally arise from the numerous internal winch components.

Particular features of the control circuit are described below having particular reference to FIG. 3 with the alternate positions of the regulating spool 52 being subsequently described with reference to FIGS. 4 and 5.

Referring now to FIG. 3, the control valve 51 includes a valve body 51' which forms the bore 53 for receiving the regulating spool 52. The rightward end of the housing 51' is closed by an end cover indicated at 57. The regulating spool 52 is urged into its centered position by a spring indicated at 58. A sleeve 59 limits travel of the regulating spool 52 in either direction from its centered position illustrated in FIG. 3. For example, when the spool 52 moves in a rightward direction, the sleeve 59 permits such travel until it engages a washer indicated at 61. The regulating spool 52 may also move in a leftward direction from its centered position until the washer 61 is shifted leftwardly into contact with the sleeve 59.

A separate portion of the housing 51' forms concentric bores 62 and 63 of different diameters which respectively contain a load piston 64 and a modulating relief valve spool 66 which comprise the modulating valve assembly 56. A pair of springs 67 and 68 are arranged for interaction between the load piston 64 and the relief valve spool 66. An intermediate stepped bore 69 provides clearance for the outer spring 68 and is also in communication with a fluid drain indicated at 71. It may be noted in the following description that the numeral 71 is employed to designate a common drain for various portions of the control valve circuit. The leftward end of the bore 62 is also closed by an end cover 72 which thus acts as a stop for leftward movement of the load piston 64.

When the regulating spool 52 is in its centered position as illustrated in FIG. 3, the hydraulic circuit is supplied with hydraulic fluid under pressure from a pump or source 73 which draws fluid from the drain or sump 71 through a filter 74. Fluid from the pump 73 is supplied to the inlet chamber 54 through a conduit 76. With the regulating spool being in its normally centered position of FIG. 3, the relief valve spool 66 produces a pressure of approximately 50 psi within the inlet chamber 54 is also graphically represented in FIG. 6. A check valve 77, producing a pressure drop of approximately 20 psi communicates fluid from the inlet chamber 54 into an annular recess 78 formed about the bore 53. As the spool 52 is moved in either direction from its centered position of FIG. 3, a plurality of metering slots 79 formed upon the spool communicate fluid from the annular recess 78 with a branched port 81 which is in communication with the brake actuating chamber 32'.

Fluid under pressure from the inlet chamber 54 is also communicated through an orifice 82 to open a low pressure check valve 83 and enter a chamber 84 to act against the modulatng relief valve spool 66. Accordingly, the modulating relief spool 66 tends to be shifted toward the left against the springs 67 and 68 in order to provide metered communication between the inlet chamber 54 and a lubrication passage 86. A relief valve 87 is adjusted to limit pressure within the lubrication passage 86 to approximately 35 psi with excess fluid pressure being communicated to the fluid drain 71.

A small diameter damping orifice 88 permits retarded movement of the spool 66 in a rightward direction to close off the lubrication passage 86 in the event of substantial force produced upon the spool 66 by the load piston 64 or in the event of a rapid pressure drop within the inlet chamber 54.

With the regulating spool 52 being in its centered position as illustrated in FIG. 3, additional metering slots 88 formed thereon place the brake port 81 in communication with the fluid drain 71 by means of a drain port 89. Another port 91 which is in communication with the clutch actuating chamber 26' is also in communication with the drain port 89 when the regulating spool 52 is in its centered position.

The modulating load piston 64 is urged leftwardly by the springs 67 and 68 into a load piston chamber indicated at 92. The load piston chamber is in communication with the inlet chamber 54 by means of a restrictive orifice indicated at 93. The restrictive orifice 93 is selectively sized to provide a modulating function as described in greater detail below. The load piston chamber is also in communication with a drain port 94 which crosses the regulating spool bore 53 for communication with the fluid drain 71. The regulating spool 52 includes an annular groove 96 which provides fluid continuity for the drain port or passage 94 when the regulating spool 52 is in its centered position as illustrated in FIG. 3. However, as the regulating spool is shifted in either direction, fluid communication along the drain passage 94 is interrupted so that fluid pressure crossing the orifice 93 tends to produce increasing pressure within the load piston chamber 92. Accordingly, it may be seen that the rate of pressure rise within the load piston chamber 92 and accordingly the rate of modulation accomplished by the load piston 64 and the relief valve spool 66 in combination with the springs 67, 68 is dependent upon the size of the restrictive orifice 93. It is further obvious from FIGS. 3–5, for example, that the rate of modulation is also dependent upon the relative areas of the load piston 64 and the relief valve spool 66 which are responsive to fluid pressure in the chambers 92 and 84 respectively.

Fluid from the conduit 76 is also delivered across a low pressure check valve 97 to a conduit 98 which is in communication with a fluid pressure accumulator indicated at 99. Additional slots 101 formed by the regulating spool 52 serve to communicate a port 102, in communication with the conduit 98, with the branched brake port 81. This mode of communication is provided when the regulating spool is shifted fully to the right to the position shown in FIG. 4 to provide an emergency means for releasing the brake 32 in the event of low pressure or complete pressure loss in the control circuit.

It is believed that the manner of operation for the present control circuit is obvious from the above description. However, a brief description of the method of operation for the control circuit is set forth below. As the regulating spool is moved in a leftward direction toward the position of FIG. 5, the groove 96 passes out of register with the drain passage 94 so that fluid pressure is developed within the load piston chamber 92 depending upon the size of the orifice 93. The width of the groove 96 is approximately 0.1 inches so that the basic pressure of 50 psi as noted above is maintained in the inlet chamber 54 until movement of the regulating spool 52 exceeds that distance in either direction. Pressure in the chamber 54 is then increased toward a maximum of about 350 psi for example. With additional movement of the regulating spool in a leftward direction, the brake port 81 is gradually placed in communication with the annular recess 78 by the metering slot to fill the brake actuating chamber 32' and gradually release the brake 32. Simultaneously, the port 91 for the clutch actuating chamber 26' is simultaneously closed for communication with the fluid drain 71 and placed in communication with the inlet chamber 54 across an annular groove 103 in the spool 52. Thus, with the brake 32 being released and the clutch 26 being engaged, the winch drum 41 is rotated to reel in the line or cable 46 as seen in FIG. 1.

As the regulating spool 52 is shifted rightwardly from its centered position, the metering slot 79 again provides gradual communication between fluid pressure in the annular recess 78 and the branched conduit 81. However, the clutch actuating chamber 26' is maintained in communication with the fluid drain port 89. Thus, the brake 32 is gradually released at a selectively controlled rate to permit the lowering or releasing of a load supported by the cable 46.

With the spool 52 being moved further to the right into the position illustrated by FIG. 4, the groove 103 communicates the inlet chamber 54 with the clutch actuating chamber 44'. Accordingly, with the regulating spool being shifted completely to the right as viewed in FIG. 4, the clutch 44 is completely disengaged to permit free wheeling rotation of the winch drum 41.

It may be noted that with movement of the regulating spool 52 in either direction from its centered position illustrated in FIG. 3, fluid pressure within the inlet chamber 54 is modulated as required for providing a pressure supply to the actuating chambers for the respective clutches and brake.

In addition to assisting in this modulation function, the modulating valve spool 66 also serves to provide limited pressurization within the lubrication passage 86. This function is of relative importance within such a winch assembly to provide for example for cooling of the respective clutches and brake with heat being generated by the substantial forces arising in the winch system, thus being removed by the cooling fluid from the lubricating passage 86.

The shift pattern for a control element as viewed in FIG. 7 may be seen as corresponding with the axial position of the regulating spool 52 in FIGS. 3–5. Means are provided to lock the control element 104 in the position illustrated in FIG. 7. Thus, the operator may leave the vehicle with the clutch 44 being disengaged in order to unreel cable from the drum 41 in the manner referred to above.

What is claimed is:

1. A modulating control valve for releasing a normally engaged brake means while simultaneously engaging a normally disengaged clutch means and for selectively releasing the normally engaged brake means, comprising:

a source of fluid under pressure;
a valve body defining an inlet chamber in communication with the fluid source and a bore, the bore being in communication with the inlet chamber, an actuating chamber for releasing the brake and an actuating chamber for engaging the clutch;
a regulating spool movably arranged in the bore with resilient means urging the regulating spool into a centered position in the bore wherein the spool communicates the clutch and brake chambers with a fluid drain, the regulating spool being movable in a first direction of travel from its centered position for variably communicating both of the clutch and brake actuating chambers with the inlet chamber, the regulating spool being movable in a second direction of travel from its centered position for variably communicating the brake actuating chamber with the inlet chamber; a modulating valve including a modulating spool and an associated load piston continuously effective in response to movement of the regulating spool for providing a pressure modulating variable outlet from the inlet chamber to thereby vary the pressure in the outlet chamber; and an accumulator means interconnected with the inlet chamber by means of a check valve and interconnected with the regulating spool bore, the regulating spool being effective to communicate the accumulator means with the brake actuator chamber as the regulating spool is moved from its centered position.

2. The modulating control valve of claim 1 wherein the regulating spool comprises metering means for variably communicating the inlet chamber with the brake actuating chamber as the regulating spool is moved in either direction from its centered position.

3. The modulating control valve of claim 2 wherein the regulating spool comprises additional metering means for variably communicating the brake actuating chamber with the fluid drain as the regulating spool is returned toward its centered position from its first direction of travel.

4. The modulating control valve of claim 1 further comprising spring means interacting between the modulating spool and load piston with a tendency to urge the load piston into a load piston chamber, the regulating spool being effective to equalize fluid pressure in the load piston chamber with fluid pressure in the inlet chamber as the regulating spool is moved from its centered position.

5. The modulating control valve of claim 4 wherein the variable outlet provided by the modulating spool supplies lubricating and cooling fluid to the brake means and clutch means, the variable outlet also being in communication with a fluid drain across a relief valve.

6. The modulating control valve of claim 4 wherein the inlet chamber is in communication with the load piston chamber through a restrictive orifice, the load piston chamber also being in communication with the regulating spool bore, the regulating spool including means for communicating the load piston chamber with a fluid drain only when the regulating spool is in its centered position.

7. The modulating control valve of claim 6 wherein the restrictive orifice between the inlet chamber and load piston chamber is selectively sized to determine the modulation rate for fluid pressure in the inlet chamber.

* * * * *